United States Patent [19]

Ross, Jr.

[11] Patent Number: 5,148,709
[45] Date of Patent: Sep. 22, 1992

[54] SPIRAL GAUGE WITH INTEGRAL SUPPORT TUBE

[75] Inventor: Herbert G. Ross, Jr., Argyle, Tex.

[73] Assignee: Rochester Gauges, Inc., Dallas, Tex.

[21] Appl. No.: 804,930

[22] Filed: Dec. 11, 1991

[51] Int. Cl.$^5$ .............................................. G01F 23/38
[52] U.S. Cl. ..................... 73/320; 73/DIG. 5; 73/308; 116/228
[58] Field of Search ...................... 73/320, 317, DIG. 5

[56] References Cited

U.S. PATENT DOCUMENTS

| | | | |
|---|---|---|---|
| 1,098,968 | 6/1914 | Pfahl | 73/320 |
| 1,520,985 | 12/1924 | Traseth | 73/DIG. 5 X |
| 2,371,511 | 3/1945 | Faus | 73/DIG. 5 X |
| 3,016,192 | 1/1962 | Cook, Jr. et al. | 73/320 X |

FOREIGN PATENT DOCUMENTS

| | | | |
|---|---|---|---|
| 402985 | 3/1943 | Italy | 73/320 |
| 18257 | of 1904 | United Kingdom | 73/320 |

Primary Examiner—Daniel M. Yasich
Attorney, Agent, or Firm—Richards, Medlock & Andrews

[57] ABSTRACT

A gauge (10) is disclosed which provides advantages in accuracy and cost. A head (16) is mounted on a reservoir containing a fluid to be monitored. A cylindrical support tube (28) is secured to the head and extends into the fluid. A head bushing (40) and a bottom bushing (42) are secured at opposite ends of the tube (28) and support a helically twisted center shaft (48) for rotation about an axis. The center shaft passes through a float (60) which is guided for movement along the axis by guide ribs (34, 36) on the support tube.

4 Claims, 2 Drawing Sheets

SPIRAL GAUGE WITH INTEGRAL SUPPORT TUBE

TECHNICAL FIELD OF THE INVENTION

This invention relates to a device for measuring the level of fluid in a reservoir and in particular to a device where a float activates the fluid level indicator.

BACKGROUND OF THE INVENTION

A fluid level gauge finds countless applications throughout industry and domestic use. In designing such a gauge, there is always a conflict between accuracy and cost. This conflict arises particularly in the situation where the gauge must reliably measure the fluid level in a tank where the fluid is in motion, such as a car. Damping mechanisms can be used to damp the gauge movement and reduce the effects of fluid motion. However, this adds to the cost of the unit. Inversely, a gauge with no damping in such an environment will read erratically and be of little use.

A need therefore exists for an improved design which achieves accuracy with low cost and reliability.

SUMMARY OF THE INVENTION

In accordance with one aspect of the present invention, a float gauge is provided for mounting in a reservoir to measure the level of a fluid within the reservoir. The float gauge includes a head mounted to the reservoir and a support tube secured to the head and extending into the fluid within the reservoir. The support tube has a side portion with at least one linear guide rib. A float is located within the support tube and is guided for motion along a first axis by the linear guide rib as the fluid level varies. The rib prevents rotational motion of the float about the first axis. A center shaft is supported for rotation about the first axis. The float rotates the center shaft about the first axis as the float moves along the first axis. Structure is provided and mounted in the head for sensing rotation of the center shaft and the structure is calibrated to indicate the fluid level in the reservoir.

In accordance with another aspect of the present invention, the head is provided with an internal vent slot. In accordance with another aspect of the present invention, a head bushing is placed between the head and support tube to support one end of the center shaft for rotation and a bottom bushing is mounted to the support tube assembly proximate the bottom of the support tube assembly to support the other end of the center shaft for rotation.

BRIEF DESCRIPTION OF THE DRAWINGS

For a more complete understanding of the present invention, and for further advantages thereof, reference is now made to the following detailed description taken in conjunction with the accompanying drawings, wherein.

DETAILED DESCRIPTION

Figure 1:
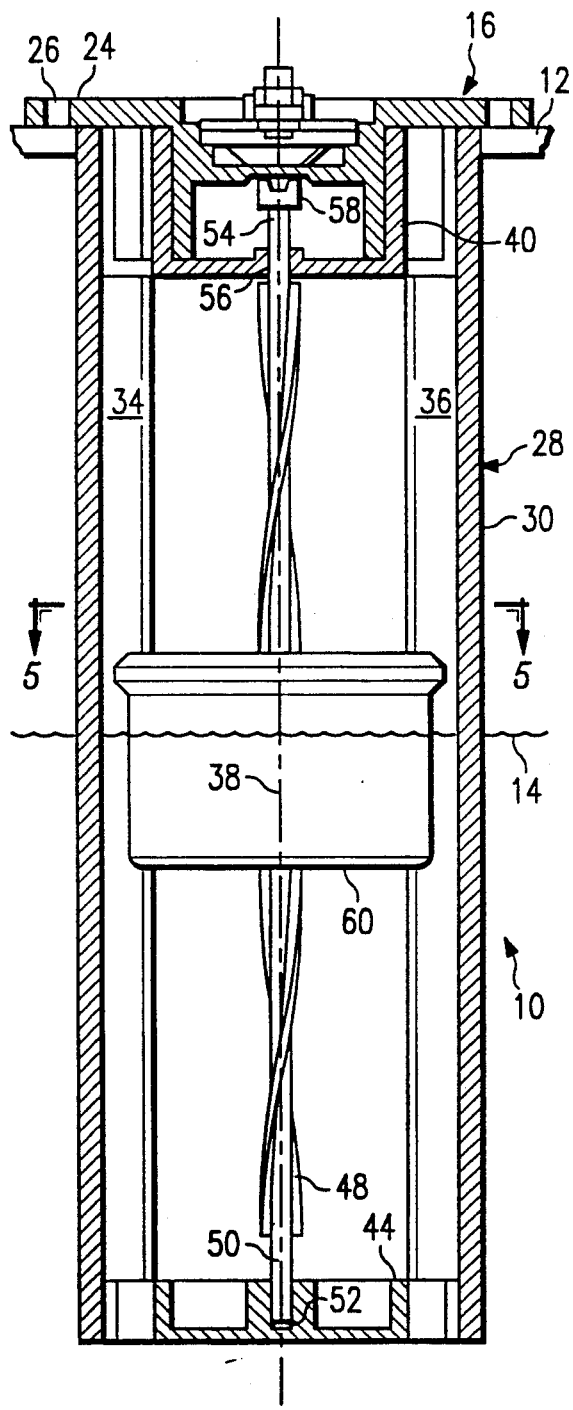
FIG. 1 is a vertical cross-sectional view of one embodiment of the present invention taken along line 1—1 of FIG. 3.
Figure 2:
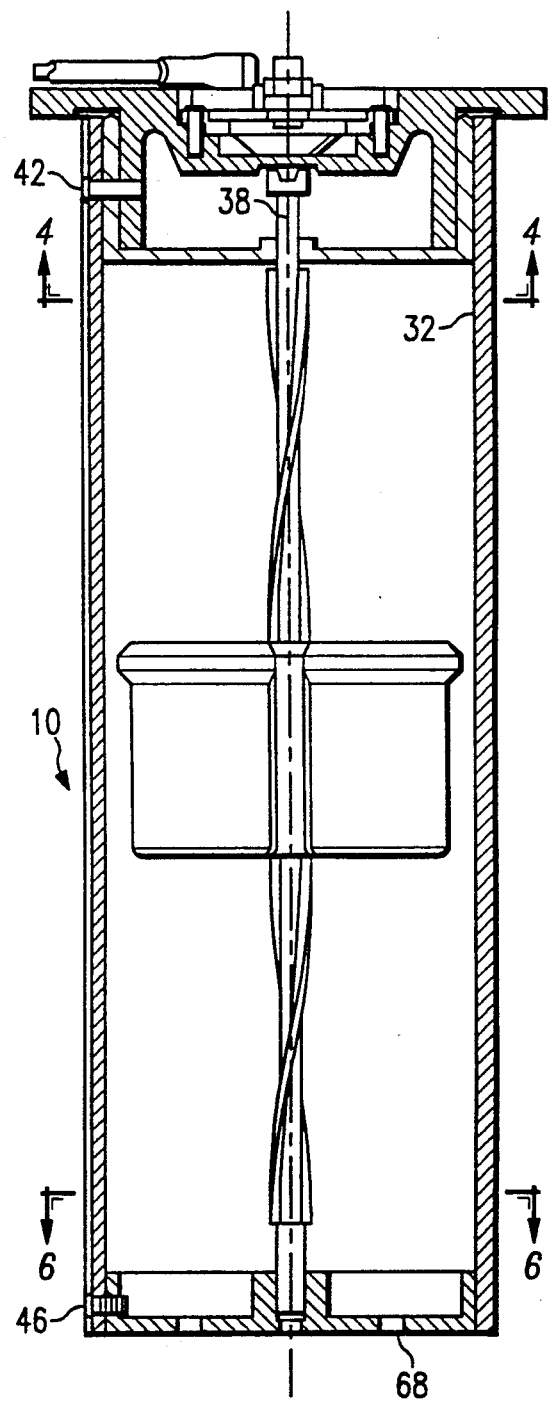
FIG. 2 is a vertical cross-sectional view of the apparatus at a right angle to the view of FIG. 1.
Figure 3:
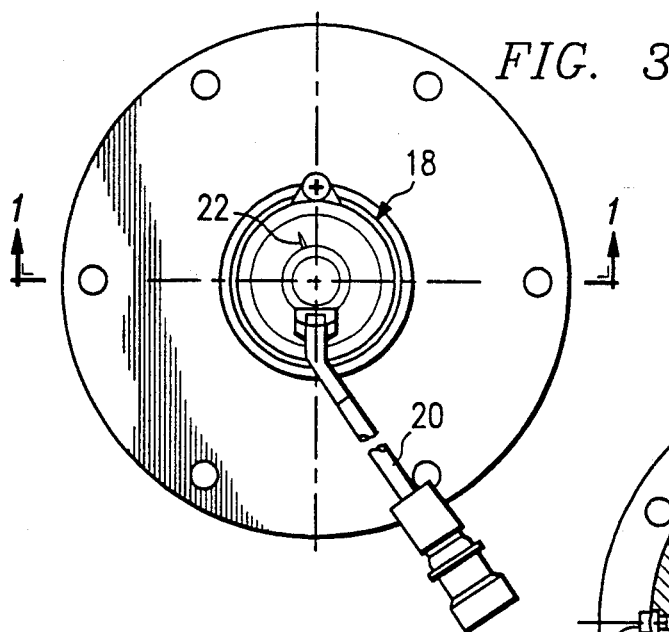
FIG. 3 is a top view of the apparatus.

With reference now to the drawings, wherein like reference numerals refer to like or corresponding parts throughout the several views, there is shown in FIGS. 1-3 a gauge 10 forming a first embodiment of the present invention. The gauge 10 is mounted in a reservoir 12 to monitor and measure the level of fluid 14.

The gauge 10 includes a head 16 which mounts a conventional dial level indicator 18 to provide a visual indication of fluid level and which can include a signal cable 20 connected to a remote level indicator. The dial level indicator 18 includes a needle 22 which is mounted for rotation with a magnet (not shown). As will be described hereinafter, a second magnet 58, which rotates in response to the fluid level, will induce movement of the magnet attached to needle 22 to rotate the needle to indicate the true fluid level. The head 16 also includes a rim 24 with a series of apertures 26 to bolt the head 16 directly to the reservoir.

As can be seen in FIGS. 1 and 2, the use of a magnetically operated indicator 18 allows the head 16 to be designed without any direct aperture into the reservoir, other than perhaps apertures 26. Thus, the head 16 can be readily sealed to the reservoir and electrical current can flow through cables 20 with little risk of igniting any volatile fumes escaping from the reservoir through the gauge.

A cylindrical support tube 28 is secured to the head 16 and extends downwardly into the fluid being monitored. The support tube 28 has a cylindrical outer surface 30, but the inner surface 32 has two facing linear ribs 34 and 36 which extend along the center axis 38 of the gauge.

Figure 4:
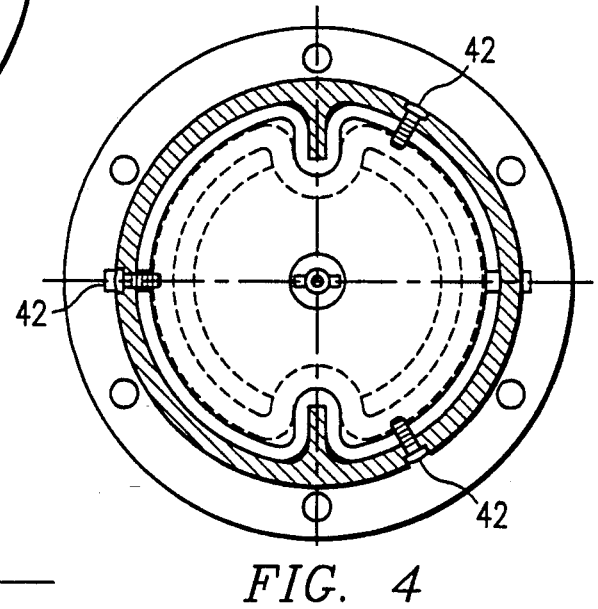
FIG. 4 is a cross-sectional view taken along line 4—4 in FIG. 2.

A head bushing 40 is mounted between the end of the tube 28 proximate the head 16 and the head 16 itself. Three screws 42 secure the tube 28 and bushing 40 to the head 16, as best seen in FIG. 4.

Figure 6:
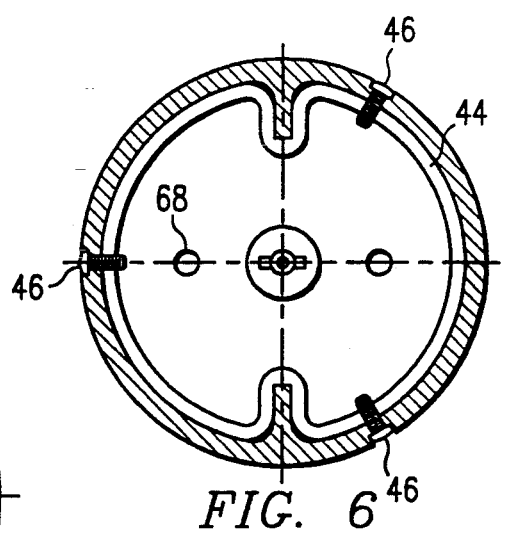
FIG. 6 is a cross-sectional view along line 6—6 in FIG. 2.

A bottom bushing 44 is secured at the opposite or bottom end of the tube 28 by three screws 46, as best seen in FIG. 6.

A center shaft 48 is supported between the bushings 40 and 44 for rotation about the axis 38. The lower end 50 of center shaft 48 fits within a blind aperture 52 in the bottom bushing 44. The upper end 54 of center shaft 48 passes through an opening 56 in the head bushing 40. A magnet 58 is mounted on the upper end 54 which interacts with the magnet connected to needle 22. Between the ends 50 and 54, the center shaft 48 has a helical twisted configuration as best seen in FIGS. 1 and 2.

Figure 5:
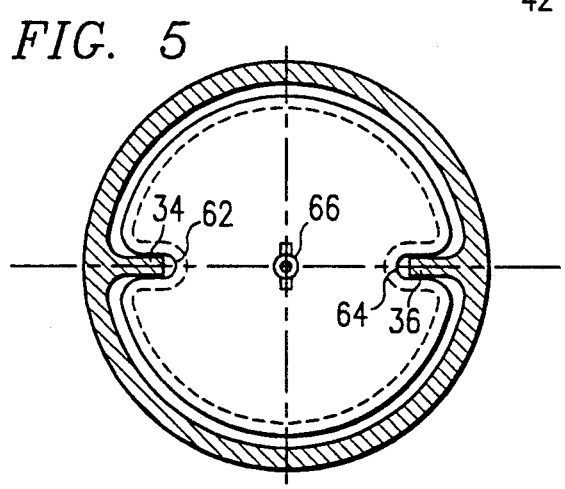
FIG. 5 is a cross-sectional view along line 5—5 in FIG. 1.

A hollow float 60 is guided within the tube 28 for movement along the center axis 38 by ribs 34 and 36 as the fluid level varies in the reservoir. The float has inwardly directed notches 62 and 64 which mate with the ribs 34 and 36, as best seen in FIG. 5. In the center of the float 60 is formed an opening 66 through which the center shaft 48 passes. The opening 66 is shaped so that linear movement of the float 60 along the ribs 34 and 36 will induce rotation in the center shaft 48 about the axis 38. The design of the gauge 10 is such as to permit very limited movement of the center shaft 48 along axis 38, and the angular position of the shaft 48 about axis 38 is therefore directly proportional to the position of the float within the tube 28, which, in turn, is determined by the fluid level itself.

Figure 7:
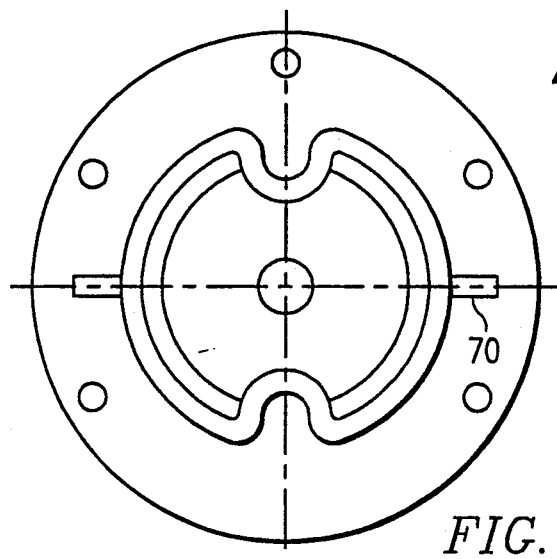
FIG. 7 is an underside view of the head.

The bottom bushing 44 has vent holes 68 formed therethrough which allows the fluid within the reservoir to flow into the interior of the tube 28 to the same level as the fluid exterior the tube as shown in FIGS. 2 and 6. Vent slots 70 are formed on the underside of the head 16, as best seen in FIG. 7, which vents the upper portion of the tube 28 back into the reservoir. Because the interior of tube 28 is connected to the remainder of the fluid only through the relatively small vent holes 68, the seiching motion of the fluid in the tank is moderated and the float more accurately and consistently indicates the true average fluid level.

The head bushing and bottom bushing are preferably molded of acetal and fit within the cylindrical support tube 28, thus eliminating the necessity of machining the inside of the support tube, which is preferably formed of aluminum. The vent holes can be molded into the bottom bushing, eliminating the need to machine vent holes in the support tube 28. The head 16 is preferably formed of die cast aluminum, the float of acetal and the drive magnet of alnico. The center shaft 48 is also preferably formed of aluminum.

Although one embodiment of the invention has been illustrated in the accompany drawings and described in the foregoing detailed description, it will be understood that the invention is not limited to the embodiment disclosed, but is capable of numerous rearrangements, modifications and substitutions of parts and elements without departing from the scope and spirit of the invention.

I claim:

1. A float gauge for mounting in a reservoir to measure the level of the fluid within the reservoir, comprising:
    a head mounted to said reservoir, said head having an integral vent slot formed therein;
    a support tube secured to said head for extending into the fluid, the support tube having a side portion with at least one linear guide rib;
    a float within said support tube guided for motion along a first axis by said linear guide rib as the fluid level varies, the guide rib preventing rotation of the float about the axis;
    a center shaft for rotation about the first axis, said shaft having a center portion of helical shape and said float rotating the center shaft about the first axis by engaging the helical section of the center shaft as the float moves along the first axis; and
    means mounted in the head for sensing rotation of said center shaft and calibrated to indicate the fluid level in the reservoir.

2. A float gauge for mounting in a reservoir to measure the level of a fluid within the reservoir, comprising:
    a head mounted to said reservoir, said head having an integral vent slot;
    a support tube having a cylindrical outer surface and an inner surface with at least one linear guide rib formed thereon;
    a head bushing fitted within a first end of the support tube;
    means to secure said first end of the support tube and head bushing to said head;
    a bottom bushing fitted within a second end of the support tube, said bottom bushing having at least one vent hole formed therethrough;
    means for attaching the bottom bushing to said support tube;
    a center shaft mounted for rotation about a first axis between said head bushing and said bottom bushing, said center shaft twisted into a helical configuration;
    a float within said support tube, said float having a passage, the center shaft passing through said passage, the float guided for movement along a first axis by said linear guide rib as the fluid level varies, the guide rib preventing rotational motion of the float about the first axis; and
    means mounted in the head for sensing rotation of said center shaft and calibrated to indicate the fluid level in the reservoir.

3. The float gauge of claim 2 wherein an end of said center shaft proximate the head bushing mounts a driving magnet, said sensing means comprising a magnetically driven indicator.

4. The float gauge of claim 2 wherein said guide rib extends the entire length of said support tube, said head bushing and bottom bushing each having clearance slots to clear the guide rib.

* * * * *